(12) United States Patent
Gebert et al.

(10) Patent No.: US 11,542,954 B2
(45) Date of Patent: Jan. 3, 2023

(54) HOUSING PRODUCED IN ONE WORKING STEP

(71) Applicant: ebm-papst Mulfingen GmbH & Co. KG, Mulfingen (DE)

(72) Inventors: Daniel Gebert, Öhringen (DE); Werner Haas, Dunningen (DE); Tobias Sieger, Geisingen (DE); Eugen Usselmann, Bad Dürrheim (DE); Wolfgang Laufer, Aichhalden (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 141 days.

(21) Appl. No.: 16/772,362

(22) PCT Filed: Dec. 13, 2018

(86) PCT No.: PCT/EP2018/084811
§ 371 (c)(1),
(2) Date: Jun. 12, 2020

(87) PCT Pub. No.: WO2019/115717
PCT Pub. Date: Jun. 20, 2019

(65) Prior Publication Data
US 2021/0381524 A1 Dec. 9, 2021

(30) Foreign Application Priority Data

Dec. 13, 2017 (DE) .................... 10 2017 011 503.6
Dec. 13, 2017 (DE) .................... 10 2017 011 504.4

(51) Int. Cl.
*F04D 29/42* (2006.01)
*F04D 29/38* (2006.01)
(Continued)

(52) U.S. Cl.
CPC .......... *F04D 29/384* (2013.01); *B29D 22/00* (2013.01); *F04D 19/002* (2013.01);
(Continued)

(58) Field of Classification Search
CPC .... F04D 19/002; F04D 29/281; F04D 29/325; F04D 29/403; F04D 29/522
See application file for complete search history.

(56) References Cited

U.S. PATENT DOCUMENTS

| 7,329,091 B2* | 2/2008 | Yan ...................... F04D 29/544 |
| | | 415/220 |
| 10,563,669 B2* | 2/2020 | Sakoda ................ F04D 29/667 |
| 2006/0039784 A1 | 2/2006 | Yan et al. |
| 2014/0186198 A1 | 7/2014 | Oda et al. |

(Continued)

FOREIGN PATENT DOCUMENTS

| CN | 102207106 A | 10/2011 |
| CN | 203175980 U | 9/2013 |

(Continued)

OTHER PUBLICATIONS

International Search Report (in English and German) and Written Opinion (In German) in corresponding PCT Application No. PCT/EP2018/084811 dated Mar. 28, 2019; ISA/EP.

(Continued)

*Primary Examiner* — Sabbir Hasan
(74) *Attorney, Agent, or Firm* — Harness, Dickey & Pierce, P.L.C.

(57) ABSTRACT

The invention relates to a housing, wherein the housing has a cover disk having a cylindrical wall and a central receptacle with a hub for supporting a fan having a diagonal fan wheel, wherein a plurality of three-dimensionally curved air guide vanes (S) are arranged about the hub, characterized in that the air guide vanes (S) are materially connected to the (Continued)

cylindrical wall and as a result, the housing is produced in one working step.

11 Claims, 5 Drawing Sheets

(51) Int. Cl.
  *F04D 19/00* (2006.01)
  *F04D 29/32* (2006.01)
  *B29D 22/00* (2006.01)
  *F04D 29/28* (2006.01)
  *F04D 29/52* (2006.01)
(52) U.S. Cl.
  CPC ......... *F04D 29/281* (2013.01); *F04D 29/325* (2013.01); *F04D 29/4226* (2013.01); *F04D 29/522* (2013.01); *F05D 2230/20* (2013.01); *F05D 2240/14* (2013.01); *F05D 2240/30* (2013.01)

(56) References Cited

U.S. PATENT DOCUMENTS

| | | |
|---|---|---|
| 2014/0286786 A1 | 9/2014 | Ragg et al. |
| 2018/0142704 A1 | 5/2018 | Sakoda et al. |

FOREIGN PATENT DOCUMENTS

| | | |
|---|---|---|
| CN | 105090106 A | 11/2015 |
| CN | 105715583 A | 6/2016 |
| DE | 202009014212 U1 | 3/2011 |
| DE | 202010016820 U1 | 3/2012 |
| DE | 102012000376 A1 | 7/2013 |
| DE | 202014010370 U1 | 6/2015 |
| DE | 102015207800 A1 | 11/2016 |
| EP | 1619393 A2 | 1/2006 |
| EP | 2418388 A2 | 2/2012 |
| KR | 20150079040 A | 7/2015 |
| WO | WO-2015075103 A1 | 5/2015 |
| WO | WO-2017026143 A1 | 2/2017 |

OTHER PUBLICATIONS

Chinese Office Action dated Oct. 28, 2020 in corresponding Chinese Application No. 201880078441.X.
Chinese Office Action dated Sep. 1, 2021 in corresponding Chinese Application No. 201880064513.5.
German Search Report Index Appendices dated Apr. 2, 2020 in corresponding German Application No. 102018132079.5.
European Office Action dated Sep. 30, 2022 in corresponding European Application No. 18825624.2.

* cited by examiner

HOUSING PRODUCED IN ONE WORKING STEP

CROSS-REFERENCE TO RELATED APPLICATIONS

This application in a National Stage of International Application No. PCT/EP2018/084811, filed on Dec. 13, 2018 and published in German as WO2019/115717 on Jun. 20, 2019. This application claims priority to German Application No. 10 2017 011 504.4, filed on Dec. 13, 2017 and German Application No. 10 2017 011 503.6, filed on Dec. 13, 2017. The entire disclosures of all of the above applications are incorporated herein by reference.

FIELD

The disclosure relates to a ventilator, in particular, a diagonal ventilator wheel produced in one work step.

High speeds are required in diverse applications. Thus, high demands result on the mechanical strength of the blade wheels of a ventilator.

A fan or ventilator, respectively, contain a plurality of impeller vanes arranged around a shaft. High demands are placed on such impeller vanes. The ventilators are supposed to be able to operate in the speed range of high speeds with respect to the dynamic-mechanical properties. Therefore, tensions caused by centrifugal forces and bending stresses, generated by the air delivery, occur on the propeller vanes in operation.

Laminating methods are known to produce ventilator impellers from fiber-reinforced plastic, for example, from glass-fiber-reinforced polyester or polyamide. For this purpose, the propeller vanes are manufactured in multiple parts, preferably, in two parts as respective lower and upper half shells by means of manual lamination in external molds. The two half shells are then joined by means of adhesive bonding and laminating over the joint seam to form a propeller vane while forming a hollow chamber.

This technology has the disadvantage that the wall thicknesses and the fiber content are not accurately reproducible by the manual lamination. Weight differences between the individual propeller vanes are the consequence. This results in imbalances in the propeller, which in turn have to be remedied by complex measures.

Further known methods relate to the production of multiple components that are assembled to form a ventilator wheel. In particular, in the case of complexly formed ventilator wheels, it is routine to manufacture them from a plurality of less complex individual components. The components are joined together to form an assembly by way of known assembly methods to form one component. These known measures display diverse disadvantages such as component number, assembly effort, high assembly costs, and a variety of tools that should be avoided.

It is therefore an object of the present disclosure to overcome the known disadvantages. It is an object of the disclosure to provide a solution for producing a ventilator wheel, in particular a radial ventilator wheel, that is implementable cost-effectively. Also, it enables use of the improved mechanical properties that may be achieved.

This object is achieved by the following measures, which can preferably also be cumulatively combined. A first measure of the solution is forming the structure of the housing for the ventilator so that the impeller may be integrally produced in a single work step, namely by an injection molding method. A further preferred measure is embodying the sprue side as thickened for the sprue during the injection molding. A further design improvement is that the vanes are connected with the largest possible radii in the transition to the inner disk or base disk.

According to a first aspect of the disclosure, the housing comprises a cover disk with a cylindrical wall and a central receptacle with a hub for mounting a ventilator having a diagonal ventilator wheel. Multiple three-dimensionally curved impeller vanes are arranged around the hub. The impeller vanes are connected in a materially-joined manner to the cylindrical wall. The housing is produced in one work step for this purpose.

It is particularly preferable if the housing, as a whole, is formed both integrally and also in one piece in this case.

It is furthermore advantageous if the one work step represents an injection molding method. The housing is produced in an injection procedure in an injection mold from a sprue side (A) to a washboard side (W). Furthermore, it is advantageous if a material thickening is provided on the sprue side on the housing.

In one advantageous embodiment of the disclosure, the impeller vanes are connected with the largest possible radii in the transition to the inner wall of the cylindrical wall.

In one favorable embodiment, the central receptacle of the housing has a shaft base. On the shaft side, therefore on the side facing toward the ventilator wheel, it is provided with an asymmetrically embodied ribbing. The ribbing is formed from multiple webs or ribs arranged in a star shape. This increases the strength of the ventilator wheel. A favorable flow behavior in the injection mold has been shown due to the asymmetrical arrangement of the webs.

In another advantageous embodiment of the disclosure, multiple ribs are arranged unevenly in number in relation to an imaginary middle partition line transversely through the housing. The ribs are diametrically opposing on both sides of the imaginary middle partition line. Preferably, three ribs are provided on a first side (sprue side) and two ribs are provided on the diametrically opposed side (washboard side).

The production is advantageously performed so that on the sprue side, at the sprue and diametrically opposing (therefore on the washboard side W), a thickening is provided once. Also, an indexing jump is provided once.

Furthermore, it is advantageous to provide two window-like openings in the region without ribbing in the shaft base, i.e., between the ribs.

In a further advantageous embodiment of the disclosure a cylindrical wall, extending around the hub is provided at the shaft base and the impeller vanes are connected integrally and in one piece using a connecting section on this wall.

A design is preferred in this case where curved ribs or webs are provided at the shaft base. The curved ribs or webs extend radially around the hub at least in sections and intersect the above described radially arranged ribs (which are arranged in a star shape). Preferably, they intersect approximately in the middle in relation to the longitudinal extension.

A further aspect of the present disclosure relates to a production method for producing the above-described housing in one work step in an injection molding method in an injection mold.

Other advantageous refinements of the invention are characterized in the dependent claims and/or are described in greater detail hereafter together with the description of the preferred embodiment of the disclosure on the basis of the figures.

DRAWINGS

The drawings described herein are for illustrative purposes only of selected embodiments and not all possible implementations, and are not intended to limit the scope of the present disclosure.

DETAILED DESCRIPTION

The disclosure is explained in greater detail with reference to FIGS. 1 to 5, wherein identical reference signs represent identical functional and/or structural features.

Figure 1:
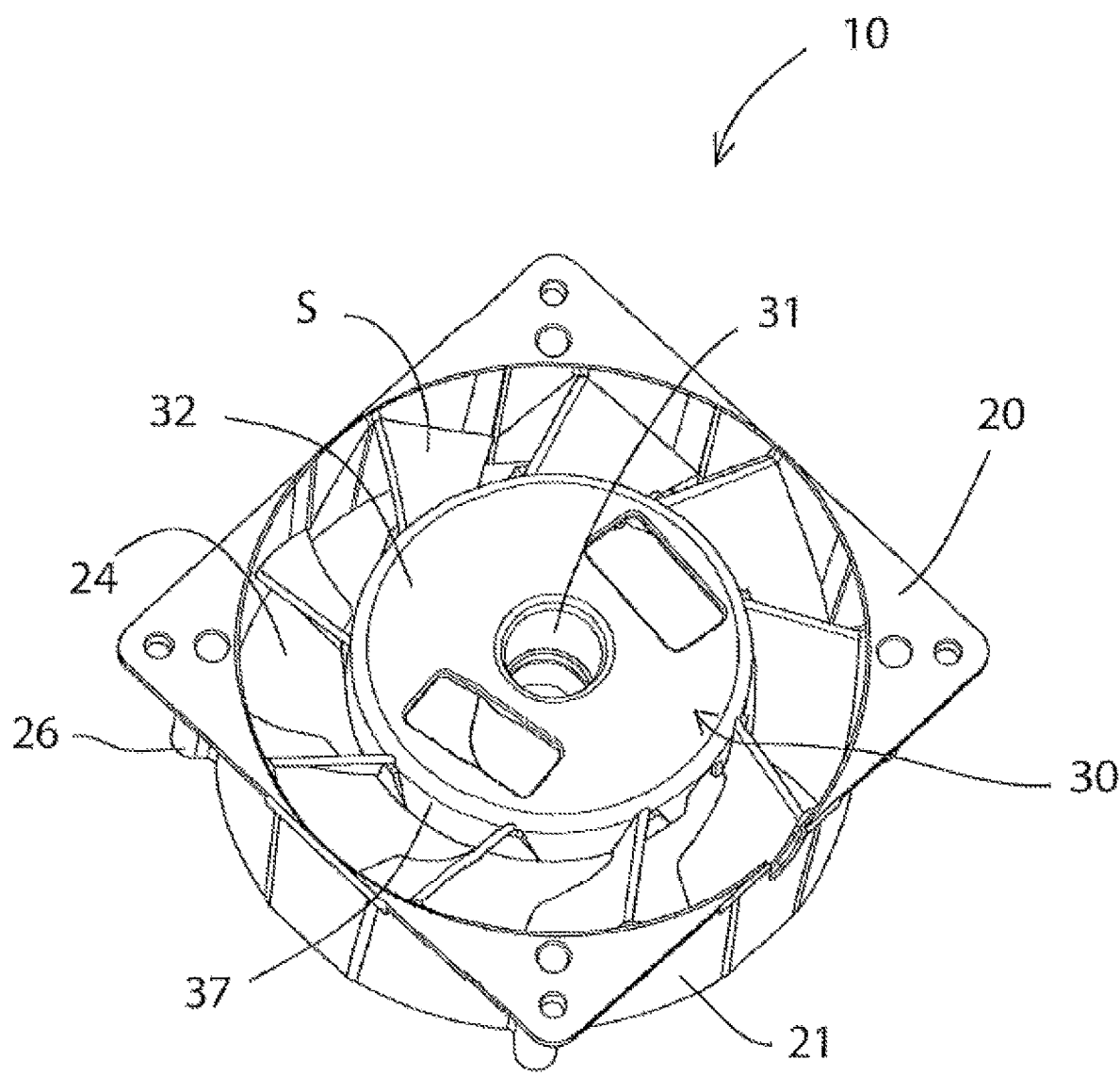
FIG. 1 is a perspective view of an exemplary embodiment of a housing produced integrally or unitarily (in one work step) for accommodating a diagonal ventilator.
Figure 5:
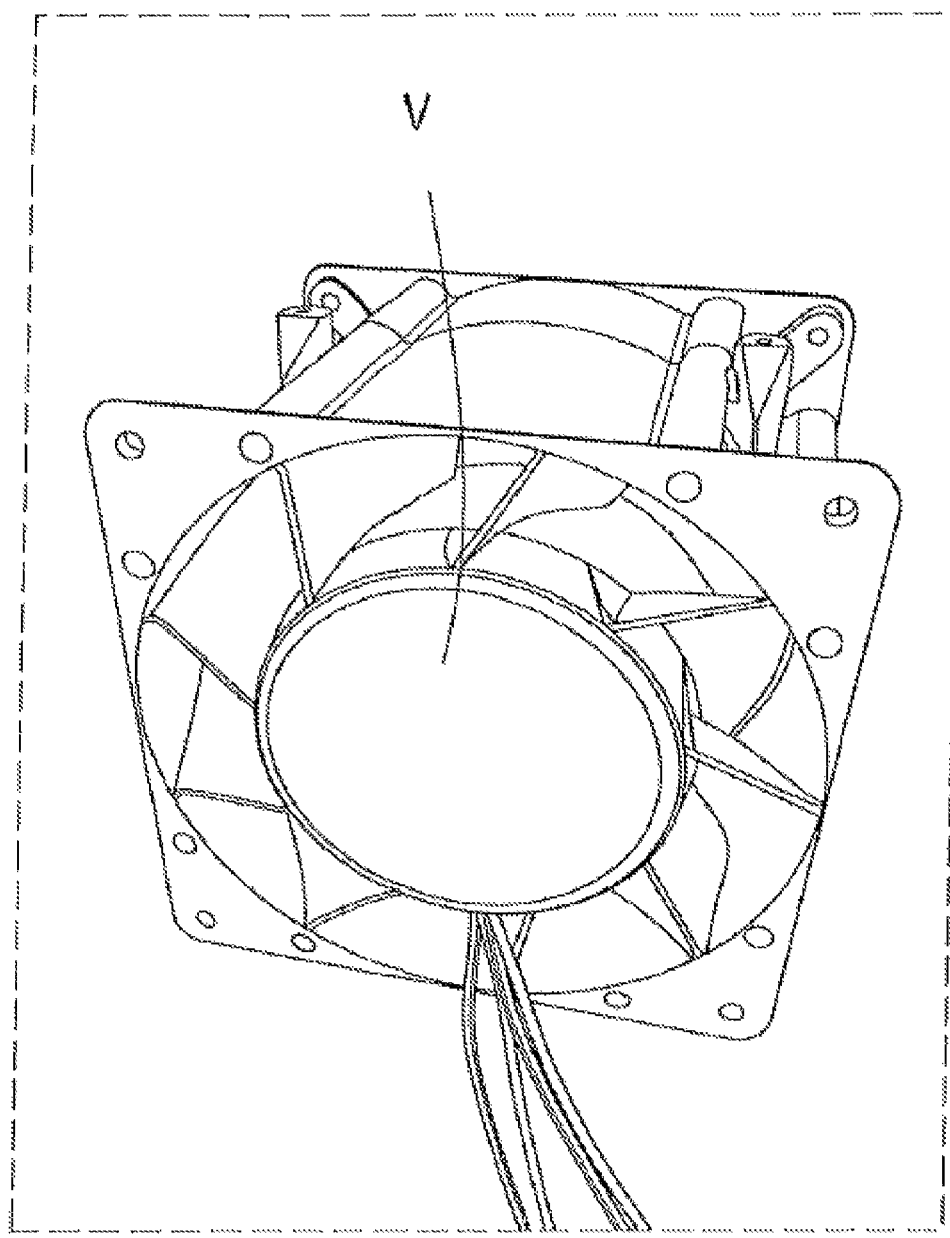
FIG. 5 is a perspective view of the housing 10 with an inserted ventilator.

FIG. 1 is a perspective view of one exemplary embodiment of a housing 10 produced integrally or unitarily (in one work step) to accommodate a diagonal ventilator, as seen in FIG. 5.

The housing 10 includes a cover disk 20, with an opening 24, and a cylindrical wall 21. The cylindrical wall 21 extends in an axial direction from the cover disk 20. The cover disk furthermore has the function here of being used as a flange connection. The cover disk 20 is brought into an assembly connection with a ventilator V, as shown in FIG. 5. For this purpose, the cover disk 20 includes flange connectors 26 at its corners.

The housing 10 includes a central receptacle 30 with a hub 31 for mounting to a ventilator. The ventilator includes a diagonal ventilator wheel. The hub 31 is connected here as a cylindrical sleeve to the shaft base 32.

Multiple three-dimensionally curved impeller vanes S are arranged and spaced apart from each other around the hub 30. These impeller vanes S are connected in a materially-joined manner to the cylindrical wall 37 of the central receptacle 30.

Figure 4:
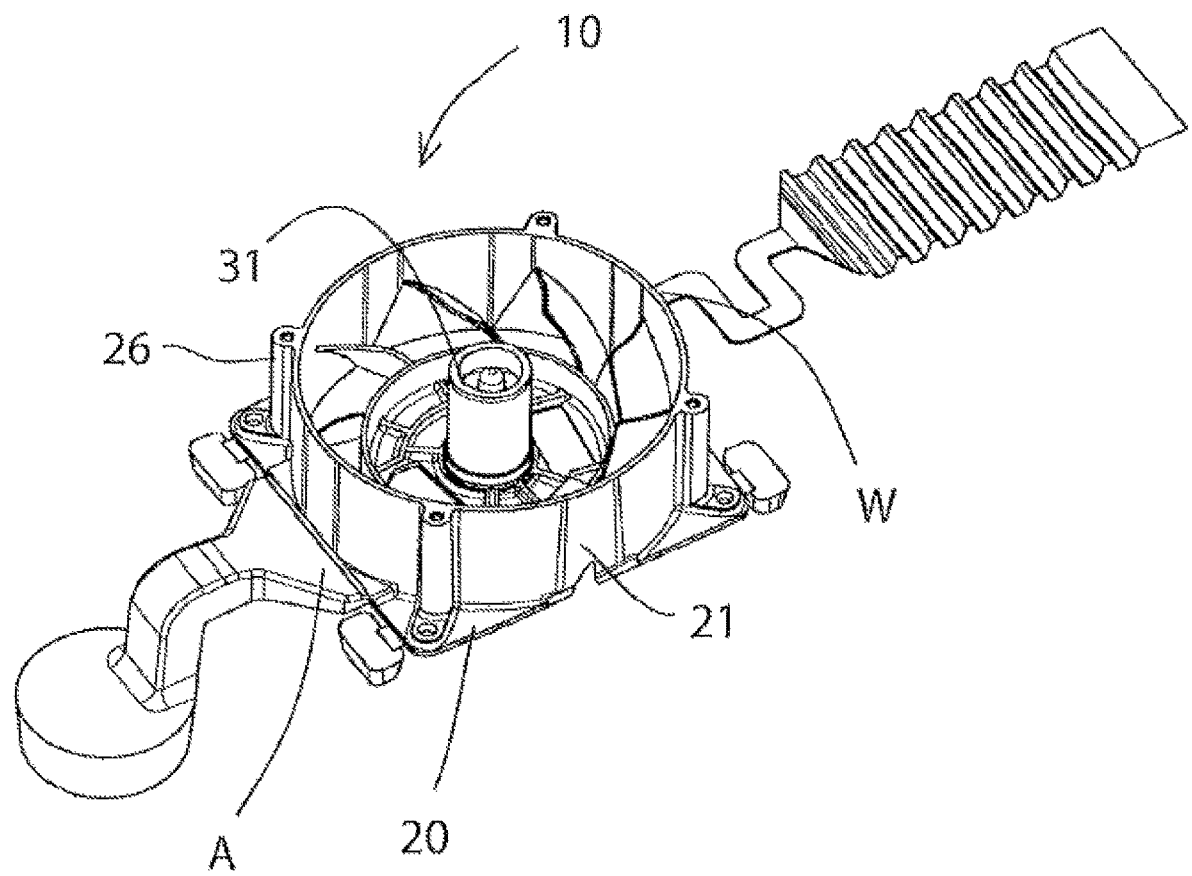
FIG. 4 is a schematic view of an injection molding profile from the sprue side up to the indexing on the washboard side.

The process direction during the injection is well visible from FIG. 4. FIG. 4 is supposed to schematically show the one work step in the injection molding method. The housing 10 is produced in an injection procedure in an injection mold via a sprue from a sprue side A to a washboard side W. The channel profile in the region after the outlet W, to the washboard side of the injection mold, is a formed curved. Therefore, a material thickening 12, as is schematically indicated in FIG. 2, is located on the sprue side on the housing 10 in the region of the attachment of the sprue on the sprue side A.

Figure 2:
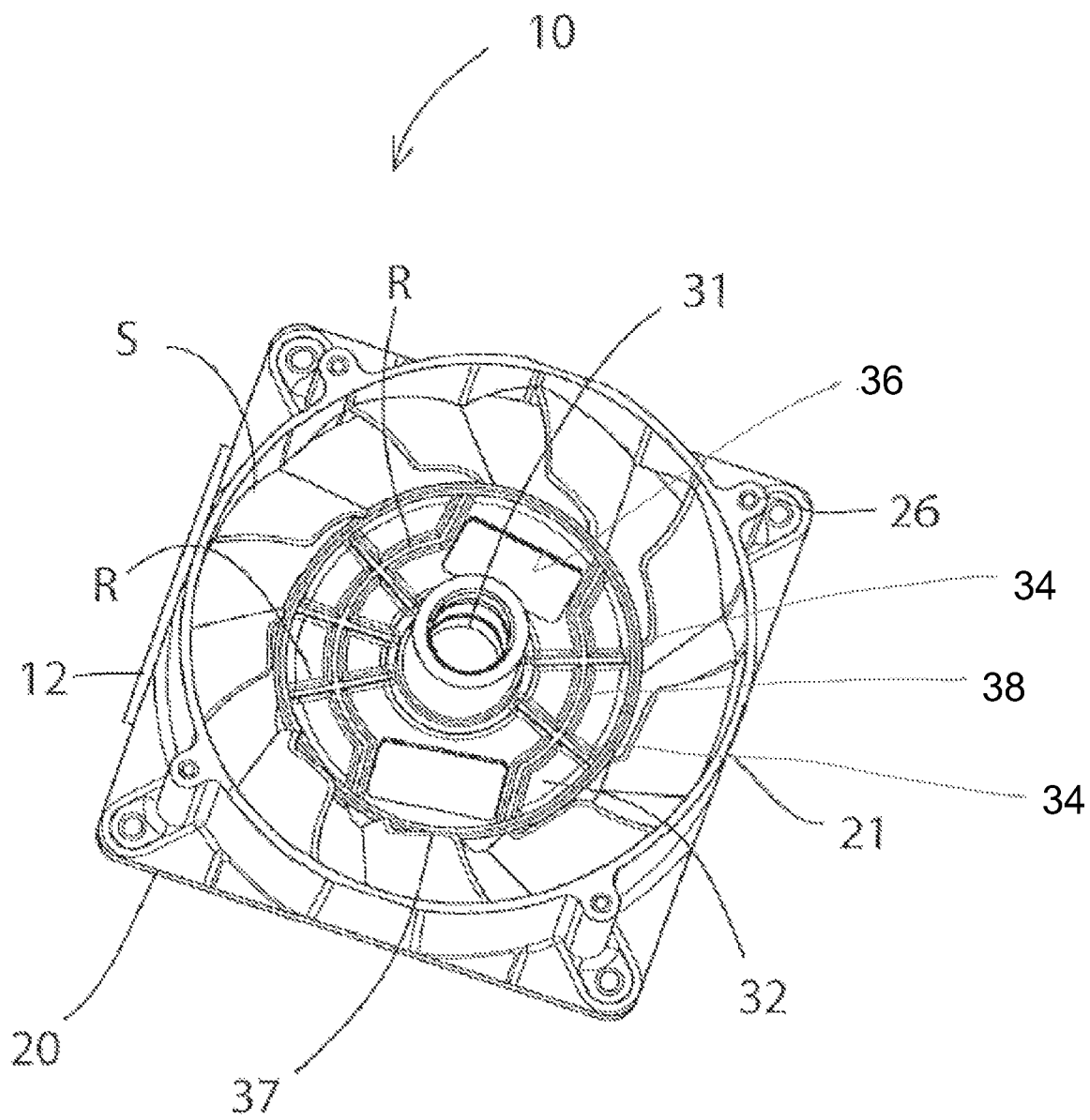
FIG. 2 is an opposing perspective view of the exemplary embodiment of a housing produced integrally or unitarily (in one work step) according to FIG. 1.
Figure 3:
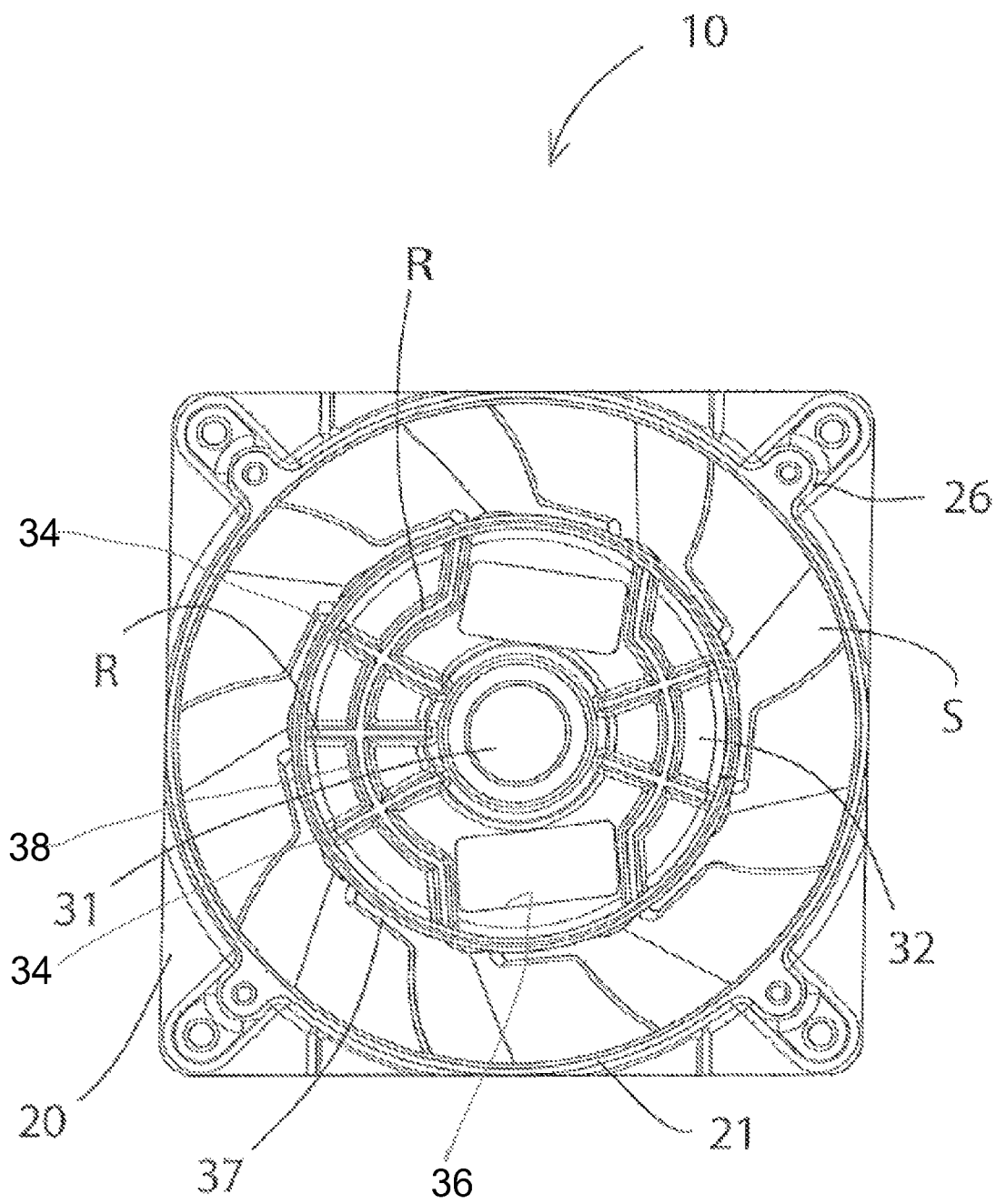
FIG. 3 is a top plan view of the housing in FIG. 2.

FIG. 3 shows a top view of the view from FIG. 2. The central receptacle 30 of the housing 10 has a shaft base 32. The shaft base 32 includes an asymmetrically embodied ribbing made up of ribs R on the shaft side. Thus, the ribbing 12 is on the side facing toward the ventilator wheel.

Multiple (here 5) webs or ribs 34, arranged in a star shape are provided in this embodiment. These multiple ribs 34 are aligned unevenly in relation to an imaginary middle partition line T in the position. Furthermore, two window-like openings 36 are provided in the region without ribbing in the shaft base 32. These openings are also oriented asymmetrically in relation to the hub 31.

Furthermore, two curved (partially circular) ribs 38 are provided on the shaft base 32. The two curved ribs 38 are arranged at least in sections radially around the hub 31. They intersect the radially arranged ribs 34 approximately in the middle in relation to the longitudinal extension. Each curved rib 38 extend on both sides at the end up to the cylindrical wall 37.

The production is executed so that a thickening is provided once and an indexing jump is provided once, on the sprue side at the sprue A and diametrically opposing (therefore on the washboard side W).

The disclosure is not restricted in its embodiment to the above-specified preferred exemplary embodiments. Rather, a number of variants is conceivable that make use of the illustrated solution according to the disclosure even in embodiments configured fundamentally differently.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A housing for a ventilator with a diagonal fan, comprises:
    a cover disk having a first cylindrical wall and a central receptacle with a hub for mounting the ventilator including a diagonal ventilator wheel;
    multiple three-dimensionally curved impeller vanes are arranged around the hub;
    the impeller vanes are connected in a materially-joined manner to a second cylindrical wall of the central receptacle;
    the housing is produced in one work step injection molding process;
    the central receptacle of the housing forms a shaft base, the shaft base is on a shaft side, on the side facing toward the ventilator wheel, and the shaft base includes an asymmetrically embodied ribbing formed from several webs or ribs arranged in a star shape, the ribbing increases the strength of the shaft base for supporting the ventilator wheel.

2. The housing according to claim 1, wherein the housing is formed both integrally and also in one piece.

3. The housing according to claim 1, wherein the one work step injection molding process produces the housing produced in an injection procedure in an injection mold from a sprue side to a washboard side.

4. The housing according to claim 3, wherein a material thickening is provided on the sprue side on the housing.

5. The housing according to claim 3, wherein the process is performed in such a way that a thickening is provided once and an indexing jump is provided once, on the sprue side at a sprue and diametrically opposing on the washboard side.

6. The housing according to claim 1, wherein the impeller vanes are connected with radii in the transition at an inner wall of the first cylindrical wall.

7. The housing according to claim 1, wherein several respective radially extending ribs are arranged unevenly in number in relation to an imaginary middle partition line through the housing, diametrically opposing on both sides of the imaginary middle partition line, wherein three ribs of the radially extending ribs are provided on a first side and two ribs of the radially extending ribs are provided on the diametrically opposing side.

8. The housing according to claim 7, wherein curved ribs are provided at the shaft base that are arranged radially around the hub at least in sections and intersect the radially arranged ribs, at approximately a middle in relation to a longitudinal extension of the radially arranged ribs.

9. The housing according to claim 1 wherein that two window-like openings are provided in the shaft base in a region without ribbing.

10. The housing according to claim 1, wherein the second cylindrical wall extending around the hub is provided at the shaft base and the impeller vanes are integrally connected, using a connecting section, to the second cylindrical wall.

11. A method for producing the housing according to claim 1, wherein the housing was produced in one work step in an injection molding method in an injection mold.

\* \* \* \* \*